United States Patent [19]

Church

[11] Patent Number: 4,483,904
[45] Date of Patent: Nov. 20, 1984

[54] CONNECTING FIBRE REINFORCED PULTRUSIONS

[76] Inventor: Kenneth S. Church, Box 1186, Gimli, Manitoba, Canada, R0C 1B0

[21] Appl. No.: 488,670

[22] Filed: Apr. 26, 1983

[51] Int. Cl.³ .......................... B32B 9/04; B29B 3/00; B27F 1/10
[52] U.S. Cl. ........................................ 428/543; 428/57; 428/294; 428/375; 156/242; 264/134; 264/137; 264/257; 264/274; 264/279; 264/279.1
[58] Field of Search ................ 428/57, 294, 375, 373, 428/543; 156/242; 264/134, 135, 136, 137, 257, 274, 279, 279.1

[56] References Cited

U.S. PATENT DOCUMENTS

| | | | |
|---|---|---|---|
| 2,217,085 | 10/1940 | Wheeler | 264/139 |
| 3,185,605 | 5/1965 | Osborne et al. | 264/257 |
| 3,890,679 | 6/1975 | Simon | 264/257 |
| 4,414,262 | 12/1983 | Hartmann et al. | 264/136 |

*Primary Examiner*—Marion E. McCamish
*Assistant Examiner*—Beverly Johnson
*Attorney, Agent, or Firm*—Stanley G. Ade

[57] ABSTRACT

A composite fibre reinforced body is formed from a first portion in which the reinforcing fibres thereof are exposed and splayed at one part upon which part is cast a settable liquid which wicks into the spaces between the splayed fibres to integrate the two portions. The fibre reinforced body is a pultrusion of glass fibre and thermosetting resin and a second portion is an aqueous plastic resin of viscosity less than 500 centipoise.

20 Claims, 6 Drawing Figures

CONNECTING FIBRE REINFORCED PULTRUSIONS

BACKGROUND OF THE INVENTION

This invention relates to a method for forming a fibre reinforced body and to a body formed according to the method. The method is particularly applicable to glass fibre reinforced pultrusions which are integrally connected by the method to a casting formed of a plastic material or are reformed on their ends into various end shapes for connection to co-operating parts. Pultrusions and extrusions using fibreglass reinforcement have been known for many years and have, for that period, had problems of connection of the pultrusion or extrusion to a further body.

Extrusions and pultrusions of this type necessarily have parallel walls often in the form of rods or bars and it has not been possible to form a portion of increased cross section for connection to tools or other members with which the rod or bar is to be operated. In addition, the connection of the extruded or pultruded member to other members to form a complex structure has been difficult.

The industry has always resorted to various adhesives and to various materials for the additional member which shrink on setting so as to tightly clamp the pultruded or extruded member. Combinations of adhesive and the shrink-setting materials have been used. However, none of these solutions have been readily effective, most particularly in relation to firmly securing tools or other members to a pultruded rod. Examples of such devices are sucker rods, guy and anchoring members, dead-end hydro insulators. The problem in this connection is quite complex and relates to tensile cycles, to failure and interlaminar shear as all glue at connections is simply fixed to the outer sheath of fibres on the profile. These fibres pick up the loading forces first and often fail and shear away from the rest of the profile.

SUMMARY OF THE INVENTION

It is one object of the invention therefore to provide a method of forming a composite fibre reinforced body by which a fibre reinforced pultruded member can be integrally attached to a cast member with a bond of substantially the same strength as the member itself.

According to a first aspect of the invention therefore there is provided a method of forming a fibre reinforced body comprising providing a first body portion having reinforcing fibres embedded therein and having at one part thereof the reinforcing fibres exposed and splayed, applying onto the exposed fibres a settable liquid moulded to define a second body portion so that the liquid enters the spaces between the splayed fibres and setting the liquid so that the first and second portions form a structure integrated by the exposed fibres.

According to a second aspect of the invention there is provided a fibre reinforced body comprising a first body portion and a second body portion, the first body portion having reinforcing fibres embedded in the material thereof, the reinforcing fibres at one part of the first body portion being exposed from the body portion and splayed, said exposed fibres being embedded in the material of the second body portion so as to integrate the first and second portions.

It is one advantage of the invention therefore that the fibres reinforcing the first body portion are fully embedded in the second body portion and thus provide a bond with the second body portion which is equally as strong as the fibre reinforced first body portion.

It is a further advantage of the invention that it can be used to secure the end of rods into a cross member for forming a grid-type structure for use as a pen dividing panel.

It is a yet further advantage of the invention that it can be used to secure the ends of pultruded rods to various end portions with a bond which is substantially as strong as the rod itself.

It is a yet further advantage of the invention that it can be carried out simply and cheaply by merely heating the embedding resin of the pultruded member for a short length adjacent one end and then applying pressure to the end of the fibres where the resin has lost its strength so as to splay the fibres relative to the rod.

According to a further aspect of the invention, there is provided a method of attaching a part to a rod having reinforcing fibres embedded therein comprising exposing and splaying the fibres at one end of the rod, applying to the splayed fibres a settable liquid so that the liquid enters the spaces between the splayed fibres, setting the liquid so that a frusto-conical body is formed on the end of the rod integrated thereto by the exposed fibres and applying the part having an internal frusto-conical surface to the end of the rod such that the frusto-conical portion connects with the surface to maintain the part against axial movement off the end of the rod.

According to a yet further aspect of the invention there is provided a rod and an attached part, the rod having reinforcing fibres embedded therein and a frusto-conical portion formed at one end thereof with the reinforcing fibres splayed and embedded in said frusto-conical portion, and the part having a female frusto-conical inner surface for co-operating with the portion to retain the part against axial movement off the end of the rod.

It is a further advantage of the invention therefore that the rod can be attached to various end parts by a flared frusto-conical portion formed by splaying the fibres and then fixing them in the splayed condition so as to form a portion which prevents the part from being pulled off the end of the rod without first breaking the rod or fibres embedded therein.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

A rod 10 is manufactured from fibreglass reinforcing fibres and thermosetting resins by pultrusion which is a well-known technique similar to extrusion except that the material is drawn through the die by pulling as opposed to internal pressure. The details of this technique are known and hence will not be described here and similarly suitable resins and other plastic material which are thermosetting are well-known and do not require to be recited in detail. It is suffice to say that following pultrusion the thermosetting material sets to form a rod 10 of circular cross section with smooth outer walls and with the reinforcing fibres lying substantially along its length.

Figure 1:
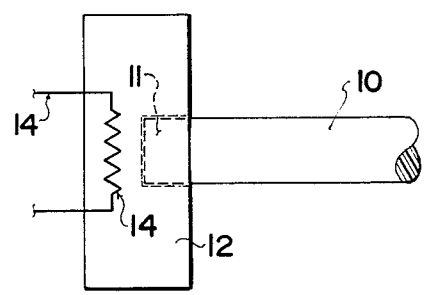
FIG. 1 is a schematic side elevation of a pultruded fibreglass reinforced rod pressed against a heating member to heat the resin material adjacent one end.
Figure 2:
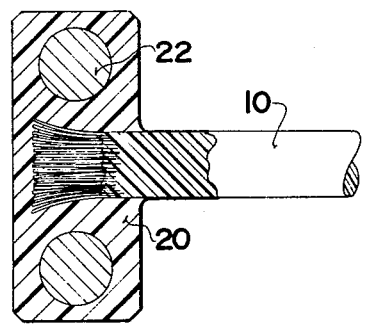
FIG. 2 is a side elevational view partly cut away of the rod of FIG. 1 embedded in a cross member.
Figure 3:
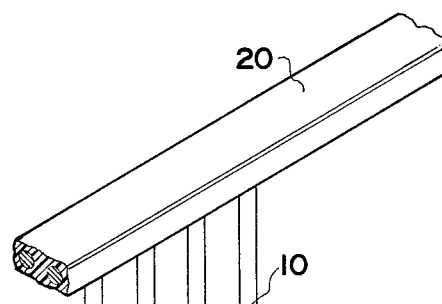
FIG. 3 is an isometric view of a fencing arrangement manufactured from the rod and cross member shown in FIG. 2.
Figure 4:
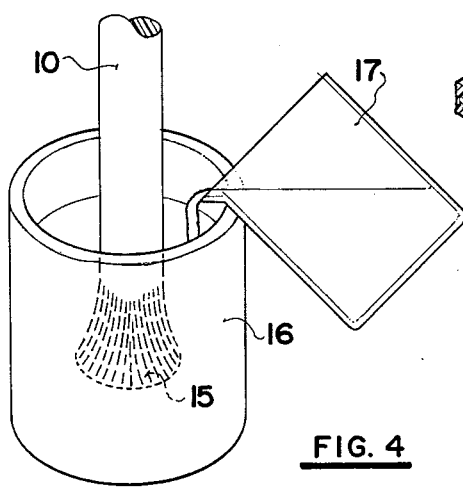
FIG. 4 is a schematic illustration of the method of casting a second body around the splayed fibres of the rod of FIG. 1.

Lengths of rod 10 can be cut to the required size from the pultruded length, one of which is shown in FIGS. 1, 2 and 4 and several of which are shown in FIG. 3.

One end of the cut length is shown in FIG. 1 and in the process according to the invention is inserted into a blind hole 11 in a plate 12 heated by a coil 14. The plate is heated to a temperature lying in the range of 220° F. to 500° F. and preferably of the order of 300° F. for a period of 30 seconds. It has been found that using a rod of half-inch diameter, a blind hold of the same diameter and of half-inch deep is sufficient to heat the resin and fibres adjacent the end of the rod 10 to a temperature at which the thermosetting resin changes its physical structure and loses its strength. This state occurs at a temperature which can be considered to be the heat distortion temperature of the material. The temperature at which this occurs varies for the material concerned, but lies in the range stated and can be obtained by simple experimentation.

The integrity of the fibres however, is unaltered since they can readily withstand temperatures up to 1000° F.

It has been found that the same condition can be achieved in rods of three-quarter inch diameter by using a similar blind hole of the same diameter as the rod, but of two inches depth since this increased depth is necessary to achieve the required amount of heating through the rod.

Figure 1A:
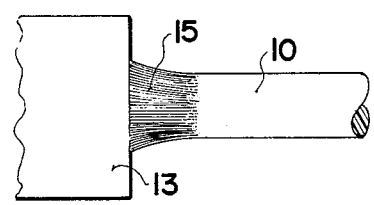
FIG. 1A is a schematic side elevation showing the compression of the end of the rod to burst the fibres.

Following heating, the rod is removed from the plate 12 and immediately pressed against a surface. In the condition of the resin, the resin has lost its strength and adhesion and allows the fibres to burst apart to a length dependent upon the amount of heating that has been applied and hence the length of resin that has been degraded. The resin remains within the burst part of the rod adhered to the fibres but does not interfere with their movement relative to one another thus providing a brush-like appearance. This is shown in FIG. 1A where the rod 10 is pressed against a surface 13 and the fibres are released from the degraded resin and allowed to spread or splay or burst, as shown at 15.

The spread fibres under the above stated conditions generally extend back along the rod by about half an inch and this is the preferred length although up to one inch splayed portion may be employed in many cases and in some cases several inches may be required for larger cross sections of pultruded profile. These conditions are achieved using a rod which has of between 25% and 60% by weight (50% by volume) of resin relative to the fibre content.

In such a rod of half an inch diameter, there will be up to ¼ million fibres in the cross section having a continuous length, having been drawn from a spool of windings often exceeding 20,000 ft.

The splayed section provided by the above technique can be either provided at one end of a rod or at both ends or can even be provided at a mid-point by applying heat at the mid-point and compressing the ends inwardly. In addition, it is possible to provide the splayed portions during the initial manufacturing process in which pressure is applied to the body prior to allowing the heated thermosetting material to properly set, in which case the additional heating step can be avoided. Although the above description has related to a rod generally of circular cross section, the technique can be applied to any pultruded body to splay and expose fibres at one end or at any other part on its surface, as required.

Turning now to FIG. 4, the rod 10 with splayed portion 15 is located in position within a mould 16 into which is poured a resinous thermal setting plastic material from a suitable container 17. The material has a viscosity less than 500 centipoise and preferably of the order of 400 centipoise which provides a very low viscosity liquid which tends to wick into the spaces between the exposed fibres in the flared portion 15. The potting material is thermosetting and is heated in the mould to the setting temperature so that within 30 seconds it is set within the mould to provide a moulded body around the rod 10.

It has been found that using a material of this low viscosity leaves no air pockets or very few air pockets remaining between the fibres of the flared portion 15 thus causing the fibres and potting material to merge forming a fibre reinforced body which locks the potted portion onto the rod 10 with a strength dependent upon the fibres and substantially equal to the strength of the rod 10.

The potting material preferably employed is polyurethane but other materials can be used particularly aqueous plastic resin such as epoxy or polyester.

As shown in FIG. 4, the potted portion of the integral body is of simple cylindrical form, but this is illustrated merely as an example and it will be appreciated that more complex forms can be moulded for various end uses. Particularly, the moulded or potted portion can be shaped to receive a coupling member of a tool such as a sucker rod, guy and anchoring members and dead-end hydro insulators. When moulding such more complex shapes, injection moulding techniques (not shown) can be employed and this may assist with the wicking of the thermosetting resin into the spaces between the splayed fibres.

Turning now to FIGS. 2 and 3, the technique of forming a composite body from a rod 10 and a potted or cast portion is used to form a fencing or penning section comprising a plurality of such rods 10 each end of which is embedded within a respective cross member 20. The structure is formed by standing the rods 10 vertically relative to an elongate trough-shaped mould and pouring into the mould a casting material as explained previously. To provide additional strength lengthwise of the side member 20, elongate fibreglass reinforced re-bars are laid in the trough-shaped mould prior to introducing the potting liquid. After forming one side member, the rods are inverted into the trough a second time and a side member 20 is formed on the other end to complete the structure shown in FIG. 3.

The structure thus formed in FIGS. 2, 3 and 4 comprises an effectively integral body defined of two portions, one being cast or potted into the splayed reinforcing fibres of the other. Separation between the two portions therefore is extremely difficult. The technique can be used in various arrangements but is particularly of importance in pultrusion where the resins and fibres provided are particularly suitable for separation of the embedding material from the fibres reinforcements to provide the flared portion.

The reinforcing fibres of the pultrusion are preferably glass fibres but can be boron, graphite or synthetic plastics fibres.

Figure 5:
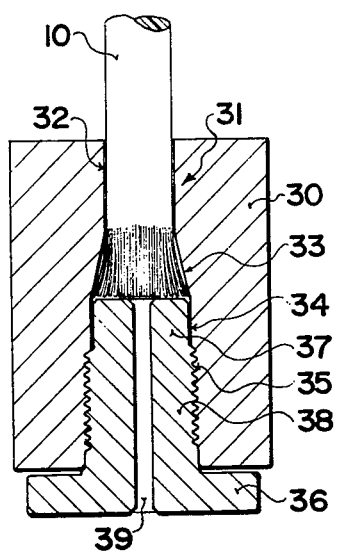
FIG. 5 is a cross sectional view of the rod of FIG. 1 attached to a metal connector.

Turning now to FIG. 5, the pultruded rod 10 is operated upon as described hereinbefore and shown in FIGS. 1 and 1A to splay and expose the end fibres at one end of the rod. The fibres thus form a substantially frusto-conical portion of the end of the rod. The rod is then passed through a connector 30 of metal or similar suitable material which includes a bore 31 having a first portion 32 corresponding to the shape of the rod, a second portion 33 which is of frusto-conical shape corresponding substantially to the frusto-conical shape formed by the exposed fibres 15, a third portion 34 which is cylindrical of the same diameter as the widest part of the frusto-conical portion 33, and a screw portion 35. Thus in a first step of attaching the connector to the rod, the rod is passed through the bore so that the end of the rod extends out of the bottom of the connector. Following this step the fibres are splayed as explained previously, and then the connector is drawn toward the end of the rod until it assumes the position shown in FIG. 5 where the splayed fibres fit into the conical portion 33. The length of the splayed portion of the fibres is chosen to match the length of the portion 33 so the fibres loosely fill the portion 33 and are confined thereby.

An injector cap 36 including a cylindrical portion 37 and screw portion 38 is screwed into the bore 31 until the end of the cylindrical portion 37 contacts or approaches the end of the fibres 15 to confine the fibres 15 within the portion 33 and to form a mould therearound defined by the portion 33 and the end face of the portion 37 of the cap 36.

The cap 36 includes a bore 39 therethrough through which the thermosetting plastic material is injected under pressure to enter the spaces between the fibres 15 in the splayed portion of the rod 10. As explained previously, the thermosetting material which may be more viscous than the non-injected embodiment, fills the spaces between the fibres and sets so as to form a frusto-conical body on the end of the rod 10.

When setting is complete the cap 36 is removed thus leaving the connector 30 attached to the end of the rod 10. The connector 30 can be used to attach the rod to a further rod by a male screw portion of the same shape as the cap 36 which is screwed into the screw 30 portion 35 sufficiently to place the frusto-conical portion under compression within the portion 33 of the bore 31.

Prior to the introduction of the rod into the connector 30, a releasing agent is added so that when the thermosetting material is introduced into the portion 33 through the bore 39 it does not adhere to the inner surface 33 thus leaving the rod free to move axially downwardly. Thus with the male portion of the next connector holding the frusto-conical portion on the end of the rod 10 under compression, the rod is fixed axially relative to the connector 30 not by adhesive forces but by compressive forces on the frusto-conical portion. This avoids the forces being communicated to a few fibres around the outside of the frusto-conical portion which can tend to break down and ensures that the forces are applied to a substantial number of the fibres throughout the cross section. Releasing agents suitable for this purpose are well-known to one skilled in the art.

In an alternative arrangement (not shown) the end cap 36 extends merely to the end of the screw portion with the portion 34 of the bore filled with the thermosetting material. In this case the male portion of the next adjacent connector merely extends to the end of the screw section and compresses the whole of the thermoset body on the end of the rod 10.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention:

1. A fibre reinforced body comprising a first body portion having reinforcing fibres embedded in the material thereof, the reinforcing fibres at one part of the first body portion being exposed from the first body portion and splayed, and a second body portion moulded from a settable liquid material such that the material enters spaces between the exposed splayed fibres to integrate the first and second portions.

2. A fibre reinforced body according to claim 1 wherein the second body portion is elongate and arranged substantially at right angles to the first body portion.

3. A fibre reinforced body according to claim 2 comprising a plurality of rods extending in parallel spaced relationship and each defining a separate first body portion and a pair of elongate cross members each arranged at right angles to the rods and each arranged at a respective end of the rods so as to join the ends of the rods together, said elongate cross members comprising second body portions.

4. A fibre reinforced body according to claim 3 wherein each elongate cross member includes glass fibre reinforced supporting rods embedded in the cast material.

5. A fibre reinforced body according to claim 1 wherein the first body portion comprises a rod and wherein the second body portion forms a portion of increased cross section relative to the rod for coupling the rod to a further member.

6. A fibre reinforced body according to claim 1 wherein the first body portion comprises a rod and wherein the second body portion comprises a frusto-conical portion formed at one end thereof with the reinforcing fibres splayed and embedded in said frusto-conical portion and including a part having a female frusto-conical inner surface for cooperating with the portion to retain the part against axial movement off the end of the rod.

7. A fibre reinforced body according to claim 6 wherein the contact between the frusto-conical portion and the surface is free from adhesive forces and including means for compressing the frusto-conical portion into the surface.

8. A method of forming a fibre reinforced body comprising providing a first body portion having reinforcing fibres embedded therein and having at one part thereof the reinforcing fibres exposed and splayed, applying onto the exposed fibres a settable liquid moulded to define a second body portion so that the liquid enters the spaces between the splayed fibres and setting the liquid so that the first and second portions form a structure integrated by the exposed fibres.

9. A method according to claim 8 wherein said first body portion is elongate and wherein the exposed fibres are arranged at one end of the elongate first body portion.

10. A method according to claim 8 wherein the first body portion is a pultruded rod formed from glass fibres embedded along the length of the body in a settable synthetic plastic material.

11. A method according to claim 1 wherein the fibres are exposed by heating the embedding material at the exposed part.

12. A method according to claim 11 wherein the embedding material is thermosetting and wherein the fibres are exposed by heating the embedding material at the part to a temperature sufficient to destroy its strength properties and applying pressure to the end of the fibres at the part.

13. A method according to claim 12 wherein the temperature of heating is in the range of 200° F. to 500° F.

14. A method according to claim 8 wherein the settable liquid has a viscosity less than 500 centipoise.

15. A fibre reinforced body when manufactured by a method according to claim 8.

16. A method according to claim 1 wherein the first body portion comprises a rod wherein the second body portion comprises a frusto-conical body and wherein a part having an internal fruso-conical surface is applied to the end of the rod such that the frusto-conical portion connects with the surface to maintain the part against axial movement off the end of the rod.

17. A method according to claim 16 wherein the part is applied to the end of the rod prior to the application of the settable liquid so as to define a mould for the settable liquid.

18. A method according to claim 17 wherein some of the splayed fibres contact the internal surface prior to the application of the liquid.

19. A method according to claim 18 wherein a releasing agent is applied to the surface prior to the application of the part to the end of the rod.

20. A fibre reinforced body when manufactured by a method according to claim 16.

* * * * *